United States Patent
Isokawa

(10) Patent No.: US 10,142,518 B2
(45) Date of Patent: Nov. 27, 2018

(54) IMAGE READING APPARATUS AND IMAGE FORMING SYSTEM FOR PERFORMING ACCURATE IMAGE CORRECTION

(71) Applicant: Konica Minolta, Inc., Chiyoda-ku, Tokyo (JP)

(72) Inventor: Hiroshi Isokawa, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/267,733

(22) Filed: Sep. 16, 2016

(65) Prior Publication Data

US 2017/0094126 A1    Mar. 30, 2017

(30) Foreign Application Priority Data

Sep. 28, 2015 (JP) .................................. 2015-189149

(51) Int. Cl.
  *H04N 1/60* (2006.01)
  *H04N 1/00* (2006.01)

(52) U.S. Cl.
  CPC ....... *H04N 1/6027* (2013.01); *H04N 1/00018* (2013.01); *H04N 1/00023* (2013.01); *H04N 1/00034* (2013.01); *H04N 1/00045* (2013.01); *H04N 1/6044* (2013.01)

(58) Field of Classification Search
  None
  See application file for complete search history.

(56) References Cited

U.S. PATENT DOCUMENTS

| 2011/0217052 A1 | 9/2011 | Usui et al. |
| 2012/0147439 A1 | 6/2012 | Taki |
| 2012/0294632 A1* | 11/2012 | Nishikawa ......... G03G 15/0831 399/27 |

(Continued)

FOREIGN PATENT DOCUMENTS

| EP | 0 688 129 A2 | 12/1995 |
| EP | 1 093 290 A1 | 4/2001 |
| JP | 11-243468 A | 9/1999 |

(Continued)

OTHER PUBLICATIONS

The Extended European Search Report dated Jan. 24, 2017, by the European Patent Office in corresponding European Patent Application No. 16186806.2-1902. (7 pages).

(Continued)

*Primary Examiner* — Lennin Rodriguezgonzalez
(74) *Attorney, Agent, or Firm* — Buchanan Ingersoll & Rooney PC

(57) ABSTRACT

An image reading apparatus capable of performing accurate image correction is provided. The image reading apparatus is provided with a colorimeter which colorimetrically measures an image formed on a sheet based on the optical spectrum in a visible light range, a reference plate located in a position facing the colorimeter with a chromatic reflecting surface, a temperature detection unit configured to detect the temperature of the reference plate, the determination unit configured to determine whether or not the colorimeter is in a normal condition based on the temperature of the reference plate detected by the temperature detection unit and the optical spectrum in the visible light range.

8 Claims, 8 Drawing Sheets

(56) References Cited

U.S. PATENT DOCUMENTS

2014/0056601 A1    2/2014  Furuta

FOREIGN PATENT DOCUMENTS

| | | |
|---|---|---|
| JP | 2011-186087 A | 9/2011 |
| JP | 2013-134450 A | 7/2013 |
| WO | 2010/038881 A1 | 4/2010 |
| WO | 2010/103983 A1 | 9/2010 |
| WO | 2010/129800 A2 | 11/2010 |

OTHER PUBLICATIONS

Japanese Office Action ("Rejection Notice") dated Aug. 22, 2017, by the Japanese Patent Office in corresponding Japanese Patent Application No. 2015-189149 (6 pages).

Office Action dated Jul. 27, 2018, by the State Intellectual Property Office of the People's Republic of China in Chinese Patent Application No. 201610843391.2 (13 pages).

* cited by examiner

| color | ΔE*ab |
|---|---|
| White | 0.01 |
| Pale grey | 0.02 |
| Mild grey | 0.05 |
| Dif grey | 0.05 |
| Deep grey | 0.05 |
| Deep pink | 0.60 |
| Orange | 1.52 |
| Red | 1.32 |
| Yellow | 0.92 |
| Green | 0.92 |
| Dif green | 0.91 |
| Cyan | 0.46 |
| Deep blue | 0.17 |
| Black | 0.02 |

_US 10,142,518 B2_

IMAGE READING APPARATUS AND IMAGE FORMING SYSTEM FOR PERFORMING ACCURATE IMAGE CORRECTION

CROSS-REFERENCE TO RELATED APPLICATIONS

The present application claims priority under 35 U.S.C. § 119 to Japanese Patent Application No. 2015-189149, filed Sep. 28, 2015. The contents of this application are herein incorporated by reference in their entirety.

BACKGROUND OF THE INVENTION

Field of the Invention

The present invention relates to an image reading apparatus and an image forming system.

Description of Related Art

Heretofore, an image forming system consisting of an electrophotographic image forming apparatus and an image reading apparatus has been used. The image forming apparatus is capable of successively printing images on sheets. The image reading apparatus is provided with a scanner and a colorimeter.

A scanner can be purchased at a lower price and read an image over a wide area at a higher reading speed than a colorimeter. On the other hand, while color information can be read only from a limited area at a lower reading speed than a scanner, a colorimeter can read color information with a high degree of accuracy.

An image reading apparatus performs various types of processing by taking advantages of the features of a scanner and a colorimeter respectively. For example, an image reading apparatus reads an image printed by an image forming apparatus with a scanner, and feeds back read information to the image forming apparatus in order to correct the color, position, magnification factor and the like of the image. Specifically, an image reading apparatus adjusts a color information read by a scanner based on a color information read by a colorimeter.

Also, an image reading apparatus confirms the basic performance of a colorimeter. For example, unevenness in the light intensity of a colorimeter is corrected as a process performed for each colorimetric measurement. The unevenness in the light intensity of a colorimeter is corrected by using a white tile as a reference plate and measuring the light reflected from the white tile. Also, as a process performed during maintenance, it is roughly confirmed if wavelengths are shifted. This process makes use of a green tile as a reference plate which is colored green in correspondence with an intermediate wavelength of the visible light range, and is performed by confirming wavelength shift amounts over the entirety of the visible light range.

The color information read by a scanner can be fed back to an image forming apparatus as accurate data by associating the color information read by the scanner with the color information read by a colorimeter. Furthermore, the basic characteristics of a colorimeter can be confirmed by obtaining the amount of reflected light and a wavelength shift amount. Therefore, when outputting an image which a user wants to print out, automatic image correction can be performed with a high productivity by reading the image with a scanner.

Meanwhile, in some case (for example, refer to Japanese Patent Published Application No. 11-243468), when a white tile is used as a reference plate, it is determined according to the level of the reflected light amount whether or not there is dirt adhering to a protective glass plate of an image sensor.

However, in accordance with this technique described in Japanese Patent Published Application No. 11-243468, it is impossible to distinguish the color information read by a colorimeter between information affected by a defect of the colorimeter itself and information affected by thermochromism.

First, wavelengths can be shifted by a defect of the colorimeter. In this case, since the colorimetric measurement result of the colorimeter is not reliable, the color information read by a scanner cannot be fed back to an image forming apparatus as accurate data by associating the color information read by the scanner with the color information read by the colorimeter.

Second, even if there is no failure in the colorimeter, wavelengths can shift under the influence of thermochromism. Specifically, a sheet discharged from an image forming apparatus has been passed through a fixing unit, and therefore heated to a high temperature. Accordingly, when an image reading apparatus read the sheet discharged from the image forming apparatus, the temperature inside the image reading apparatus is elevated because of the heat generated by the sheet. The temperature of the green tile is also elevated by the heat. Accordingly, since wavelengths shift under the influence of thermochromism, color tones are changed.

Because of this, in the case of the prior art technique as described in Japanese Patent Published Application No. 11-243468, it cannot be determined whether or not a colorimeter is in a normal condition so that accurate image correction cannot be performed.

The present invention is made in order to solve such a prior art problem and it is an object of the present invention to provide an image reading apparatus and an image forming system which can performs accurate image correction.

SUMMARY OF THE INVENTION

To achieve at least one of the above-mentioned objects, reflecting one aspect of the present invention, an image reading apparatus comprises: a colorimeter structured to colorimetrically measures an image formed on a sheet based on an optical spectrum in a visible light range; a reference plate located in a position facing the colorimeter with a chromatic reflecting surface; a temperature detection unit structured to detect a temperature of the reference plate; a determination unit structured to determine whether or not the colorimeter is in a normal condition based on the temperature of the reference plate detected by the temperature detection unit and the optical spectrum in the visible light range.

In accordance with the image reading apparatus of the present invention, it is preferred that the determination unit determines, when the temperature of the reference plate detected by the temperature detection unit is within a prescribed range around a reference temperature, that the colorimeter is in an abnormal condition if a peak of the optical spectrum as detected by the colorimeter in the visible light range is shifted as compared with an initial optical spectrum in the visible light range, and that the colorimeter is in a normal condition if a peak of the optical spectrum as detected by the colorimeter in the visible light range is not shifted as compared with the initial optical spectrum in the visible light range.

Also, in accordance with the image reading apparatus, it is preferred that a cooling device is further provided to cool the reference plate within the prescribed range around the reference temperature until a second time when the temperature of the reference plate is changed to the outside of the prescribed range around the reference temperature between a first time and a second time, and the determination unit determines, when the temperature of the reference plate is within the prescribed range around the reference temperature, that the colorimeter is in an abnormal condition if a peak of the optical spectrum as detected at the first time by the colorimeter in the visible light range differs from a peak of the optical spectrum as detected at the second time by the colorimeter in the visible light range, and that the colorimeter is in a normal condition if a peak of the optical spectrum as detected by the colorimeter at the first time in the visible light range is equal to a peak of the optical spectrum as detected at the second time by the colorimeter in the visible light range.

Furthermore, in accordance with the image reading apparatus, it is preferred that the determination unit determines, when the temperature of the reference plate is out of the prescribed range around the reference temperature, that the colorimeter is in a normal condition if a peak of the optical spectrum as detected by the colorimeter in the visible light range is shifted in proportion to a change in the temperature of the reference plate, and that the colorimeter is in an abnormal condition if a peak of the optical spectrum as detected by the colorimeter in the visible light range is not shifted in proportion to a change in the temperature of the reference plate.

Still further, in accordance with the image reading apparatus, it is preferred that the determination unit determines that thermochromism is a factor of causing the peak shift of the optical spectrum as detected by the colorimeter in the visible light range if it is determined that the colorimeter is in a normal condition.

Still further, in accordance with the image reading apparatus, it is preferred that an operation display is further provided to display that the colorimeter is in an abnormal condition when the determination unit 111 determines that the colorimeter is in an abnormal condition, and that the operation display is implemented with a liquid crystal display incorporating a touch panel.

DETAILED DESCRIPTION OF THE PREFERRED EMBODIMENT

In what follows, an embodiment of the present invention will be explained with reference to drawings. However, the present invention is not limited to the following specific embodiment.

Figure 1:
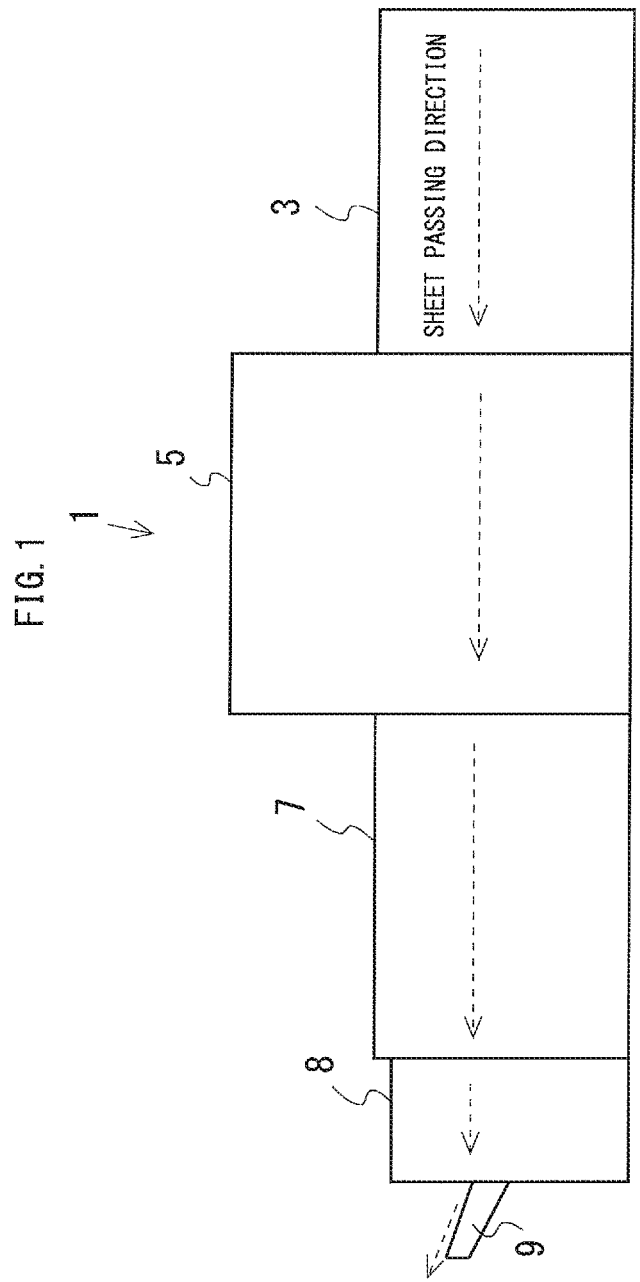
FIG. 1 is a schematic diagram for showing the overall configuration of an image forming system 1 in accordance with an embodiment.

FIG. 1 is a schematic diagram for showing the overall configuration of an image forming system 1 in accordance with the embodiment. As illustrated in FIG. 1, the image forming system 1 includes a paper feed apparatus 3, an image forming apparatus 5, an image reading apparatus 7 and a discharge unit 8. The paper feed apparatus 3 is responsible for feeding a sheet P to the image forming apparatus 5. The image forming apparatus 5 is responsible for forming an image on a sheet P fed by the paper feed apparatus 3, i.e., printing the image on the sheet P. The image reading apparatus 7 is responsible for reading a sheet P on which an image is printed by the image forming apparatus 5, and performing various types of processing. The discharge unit 8 is provided with a catch tray 9, and discharges a sheet P, which is conveyed from the image reading apparatus 7, to the catch tray 9.

Figure 2:
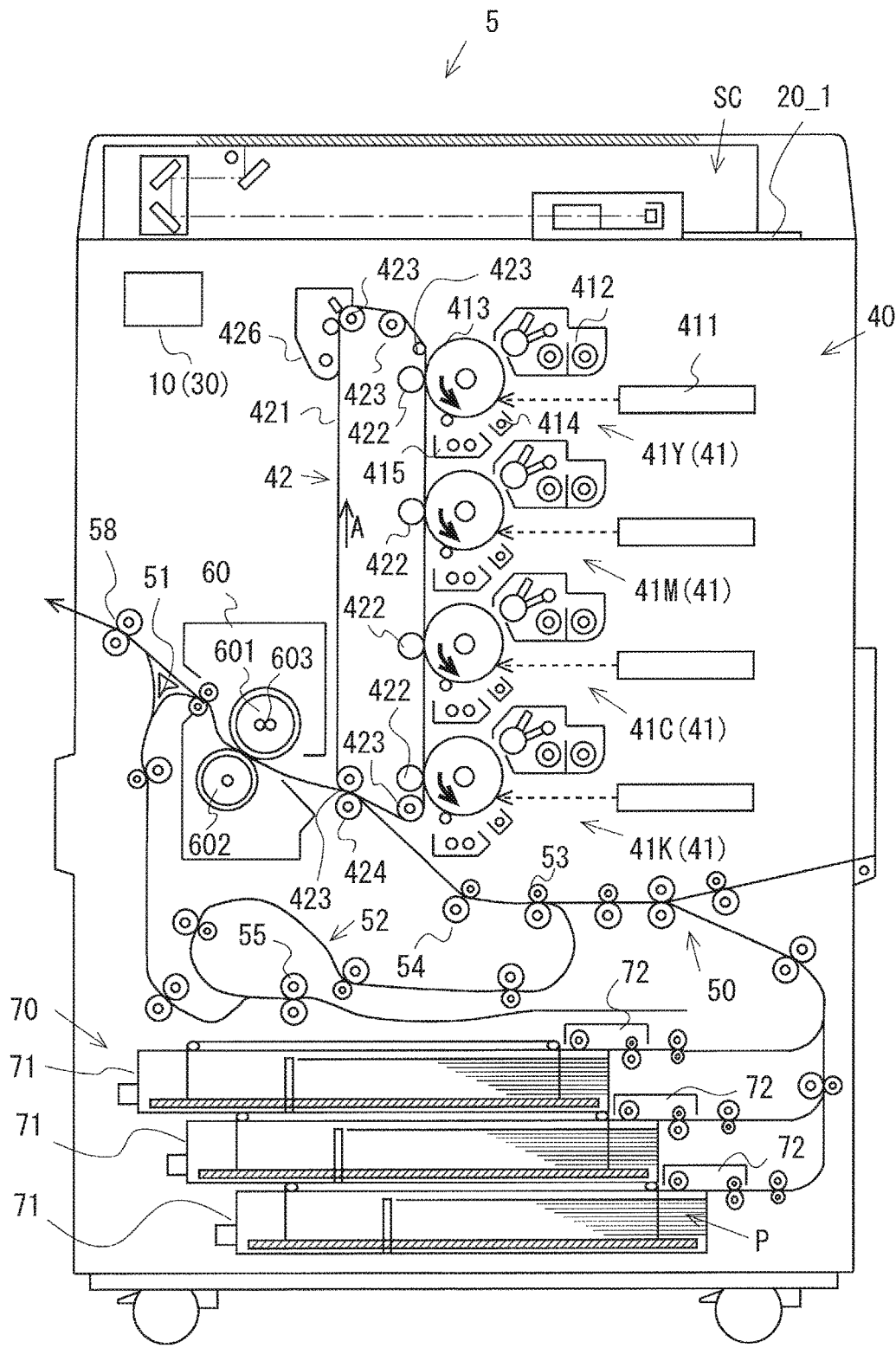
FIG. 2 is a diagram for showing an example of the configuration of an image forming apparatus 5.

Next, the image forming apparatus 5 will be specifically explained. FIG. 2 is a diagram for showing an example of the configuration of the image forming apparatus 5. As illustrated in FIG. 2, the image forming apparatus 5 is an intermediate transfer type color image forming apparatus which makes use of an electrophotographic process technique. The image forming apparatus 5 includes photoreceptor drums 413 which are serially arranged in the running direction (vertical direction) of an intermediate transfer belt 421 in correspondence with four colors, i.e., Y (yellow), M (magenta), C (cyan) and K (black). The image forming apparatus 5 is based on a vertical tandem system which successively transfers a toner image of each color onto the intermediate transfer belt 421.

Namely, the image forming apparatus 5 transfers toner images of respective colors, i.e., Y, M, C and K formed on the photoreceptor drums 413 respectively to the intermediate transfer belt 421. After superimposing four color toner images on the intermediate transfer belt 421, the image forming apparatus 5 forms an image on a sheet P by transferring the superimposed toner images.

The image forming apparatus 5 includes an original reading unit SC, an operation display 20_1, an image forming unit 40, a conveying route 50, a fixing unit 60, a control unit 10 and so forth. Also, the control unit 10 is provided with an image processing unit 30 and so forth.

The control unit 10 mainly consists of a CPU, a ROM, a RAM, and an I/O interface. The CPU reads various programs from the ROM or another memory which is not shown in the figure in accordance with required processes, loads the programs on the RAM, and executes the programs to control the operations of the respective units of the image forming apparatus 5, the original reading unit SC, the operation display 20_1 and the like.

In other words, the control unit 10 is responsible for controlling the operation of the image forming apparatus 5 and implemented with a microcomputer which mainly consists of the CPU, the ROM, the RAM, and the I/O interface. The control unit 10 executes a predetermined control program to realize necessary functions including the image processing unit 30.

The operation display 20_1 is implemented with a liquid crystal display (LCD) incorporating a touch panel, and serves as a display unit and an operation unit which are not shown in the figure.

The display unit is responsible for displaying various operation control views, the operational state of each function and so forth based on a display control signal which is input from the control unit 10. The operation unit is provided with a numerical keypad, a start key and other various operational keys. After receiving various input signals from a user, the operation unit outputs operation signals to the control unit 10. A user can perform image quality settings by operating the operation display 20_1. Also, a user can perform various settings relating to image formation such as magnification settings, optional settings, output settings, paper settings and so forth by operating the operation display 20_1. Furthermore, a user can instruct paper conveyance by operating the operation display 20_1.

For example, the paper conveying unit 70 conveys a sheet P along the conveying route 50 of the sheet P. Sheets P are stored in paper feed trays 71, extracted by paper feed units 72 and transferred to the conveying route 50.

The conveying route 50 is provided with a plurality of conveyance roller pairs including an intermediate conveyance roller pair, a loop roller pair 53 and a paper stop roller pair 54. The conveying route 50 conveys a sheet P fed by the paper feed unit 72 through the image forming unit 40, the fixing unit 60 and a discharging roller pair 58 in this order.

The original reading unit SC scans and exposes the image of an original with an optical system of a scanning exposing device, and reads the reflected light therefrom with a line image sensor to obtain image signals. The image signals are processed by performing A/D conversion, shading compensation, data compression and so on, and then input to the control unit 10 as read data of images. Incidentally, the image data input to the control unit 10 is not limited to the image data as captured by the original reading unit SC, but can be the data for example as received from another image forming apparatus, a personal computer or the like connected to the image forming apparatus 5, or stored in a portable recording medium such as a semiconductor memory.

The image processing unit 30 performs digital image processes with the input image data based on initial settings or user settings. The image processing unit 30 performs gradation level adjustment, for example, with reference to gradation level adjustment data in the form of a gradation level adjustment table. Also, the image processing unit 30 also performs other processes with the input image data such as color correction, shading compensation and other various correction processes, or compression processes. The image forming unit 40 is controlled based on the image data processed by these processes.

The image forming unit 40 is provided with image forming units 41, an intermediate transfer unit 42 and the like for forming an image based on the image data obtained by various processes performed by the image processing unit 30 with colored toners corresponding to Y component, M component, C component and K component respectively, and transfers the toner image to a sheet P.

The image forming units 41 include four image forming units 41Y, 41M, 41C and 41K corresponding to Y component, M component, C component and K component respectively. The image forming units 41Y, 41M, 41C and 41K have the similar constituent elements respectively so that similar elements are denoted by like references and redundant description is not repeated. For example, in FIG. 2, while references are given only to the constituent elements of the image forming unit 41Y for Y component, references are dispensed with for the constituent elements of the other image forming units 41M, 41C and 41K respectively.

The image forming unit 41 is provided with an exposing device 411, a development apparatus 412, a photoreceptor drum 413, a charging unit 414, a drum cleaning unit 415 and the like.

The photoreceptor drum 413 consists, for example, of a conductive cylinder (aluminum blank tube) on which an under coat layer (UCL), a charge generation layer (CGL), and a charge transport layer (CTL) are successively stacked as a negative electrification type organic photo-conductor (OPC).

The charge generation layer is made of an organic semiconductor consisting of a resin binder (for example, polycarbonate) in which a charge generating material (for example, phthalocyanine pigment) is dispersed to generate electron-hole pairs in response to exposure by the exposing device 411.

The charge transport layer is made of an organic semiconductor consisting of a resin binder (for example, polycarbonate) in which a hole transporting material (for example, electron-donating nitrogen-containing compound) is dispersed to transport positive charge generated in the charge generation layer to the surface of the charge transport layer.

The charging unit 414 consists, for example, of a corona discharge generator such as a scorotron charging unit, a corotron charging unit or the like. The charging unit 414 uniformly charges the surface of the photoreceptor drum 413 with negative charge by corona discharge.

The exposing device 411 irradiates the photoreceptor drum 413 with light corresponding to an image of each color component. The surface charge (negative charge) of the photoreceptor drum 413 is neutralized by positive charge which is generated in the charge generation layer of the photoreceptor drum 413 and transported to the surface of the charge transport layer. By this configuration, an electrostatic latent image of each color component is formed on the surface of the photoreceptor drum 413 corresponding to the differential potential from the periphery.

The development apparatus 412 stores a developer for each color component (for example, two-component developer consisting of a toner and a magnetic carrier). The development apparatus 412 forms a toner image by attaching a toner of each color component to the surface of the photoreceptor drum 413 to visualize the electrostatic latent image. Specifically, a developing bias voltage is applied to a developer carrier (developing roller) to have the charged toner on the developer carrier be transferred and attached to the exposure area of the surface of the photoreceptor drum 413 due to the differential potential between the photoreceptor drum 413 and the developer carrier.

The drum cleaning unit 415 has a drum cleaning blade, which is in a slidably contact with the surface of the photoreceptor drum 413, and the like. The drum cleaning unit 415 removes transfer residual toner which remains on the surface of the photoreceptor drum 413 after the first transfer process.

The intermediate transfer unit 42 is provided with the intermediate transfer belt 421, first transfer rollers 422, a plurality of support rollers 423, a second transfer roller 424, and a belt cleaning unit 426 and so forth.

The intermediate transfer belt 421 is an endless belt which is wound around the plurality of support rollers 423 in the form of a loop. At least one of the plurality of support rollers 423 consists of a drive roller, and the others consist of non-driven rollers respectively. For example, preferably, the support roller 423 located in the downstream side of the first transfer rollers 422 for K component in the belt running direction is preferably implemented as the drive roller in this case. When the drive roller rotates, the intermediate transfer belt 421 runs at a constant speed in the direction indicated with arrow A.

The first transfer rollers 422 are arranged in the inner surface side of the intermediate transfer belt 421 and located opposite the photoreceptor drums 413 through the intermediate transfer belt 421 in correspondence with the color components respectively. First transfer nip portions are thereby formed by urging the first transfer rollers 422 against the photoreceptor drums 413 respectively with the intermediate transfer belt 421 therebetween for transferring the toner images from the photoreceptor drums 413 to the intermediate transfer belt 421.

The second transfer roller 424 is located in the outer surface side of the intermediate transfer belt 421 and opposed to one of the plurality of support rollers 423 through the intermediate transfer belt 421. The support roller 423 located opposite the second transfer roller 424 through the intermediate transfer belt 421 is called a backup roller. A second transfer nip portion is formed by urging the second transfer roller 424 against the backup roller with the intermediate transfer belt 421 therebetween for transferring the toner images from the intermediate transfer belt 421 to a sheet P.

When the intermediate transfer belt 421 is passed through the first transfer nip portions, toner images are successively transferred from the photoreceptor drums 413 and superimposed on the intermediate transfer belt 421 respectively as a first transfer process. More specifically, a first transfer bias voltage is applied to the first transfer rollers 422 in order to charge the rear surface (which contacts the first transfer rollers 422) of the intermediate transfer belt 421 with electricity of the polarity opposite to that of toner so that the toner images are electrostatically transferred to the intermediate transfer belt 421.

The superimposed toner image on the intermediate transfer belt 421 is then transferred to a sheet P which is passed through the second transfer nip portion as a second transfer process. More specifically, a second transfer bias voltage is applied to the second transfer roller 424 in order to charge the back side of the sheet P, i.e. the side which contacts the second transfer roller 424, with electricity of the polarity opposite to that of toner so that the superimposed toner image is electrostatically transferred to the sheet P. The sheet P with the transferred toner image is conveyed to the fixing unit 60.

The belt cleaning unit 426 includes a belt cleaning blade, which is in slidable contact with the surface of the intermediate transfer belt 421, and so forth. The belt cleaning unit 426 removes toner which remains on the surface of the intermediate transfer belt 421 after the second transfer process.

Meanwhile, in the intermediate transfer unit 42, the function of the second transfer roller 424 can be implemented by an alternative structure, i.e., a so-called belt-type second transfer unit, consisting of a second transfer belt (not shown in the figure) which is wound around a plurality of support rollers 423 including the roller 424 in the form of a loop.

The fixing unit 60 is provided with a fixing roller 601, a pressure roller 602, a heating unit 603 and the like to fix a toner image transferred by the image forming unit 40 to a sheet P. Specifically, the fixing unit 60 forms a fixing nip between the fixing roller 601 and the pressure roller 602 which are urged against each other. In the fixing unit 60, the heating unit 603 heats the fixing roller 601. The fixing unit 60 fixes an image to a sheet P under the pressure applied by the pressure roller 602 and the heat applied through the fixing roller 601. After the fixing unit 60 processes the sheet P by the fixing treatment, the sheet P is discharged outwards by discharging rollers 58.

In the case where an image is to be formed also on the back side of a sheet P, the sheet P with the image formed on the front side is conveyed to a refeed conveying route 52 through a switching gate 51. The refeed conveying route 52 includes reversing rollers 55 which hold the tail end of the conveyed sheet P and then sends back the sheet P to reverse the front and back sides of the sheet P. After reversing the front and back sides, the sheet P is conveyed by a plurality of conveyance rollers and joined with a conveying route 50 in the upstream side of the transfer site for the purpose of supplying the sheet P to form an image on the other side.

Figure 3:
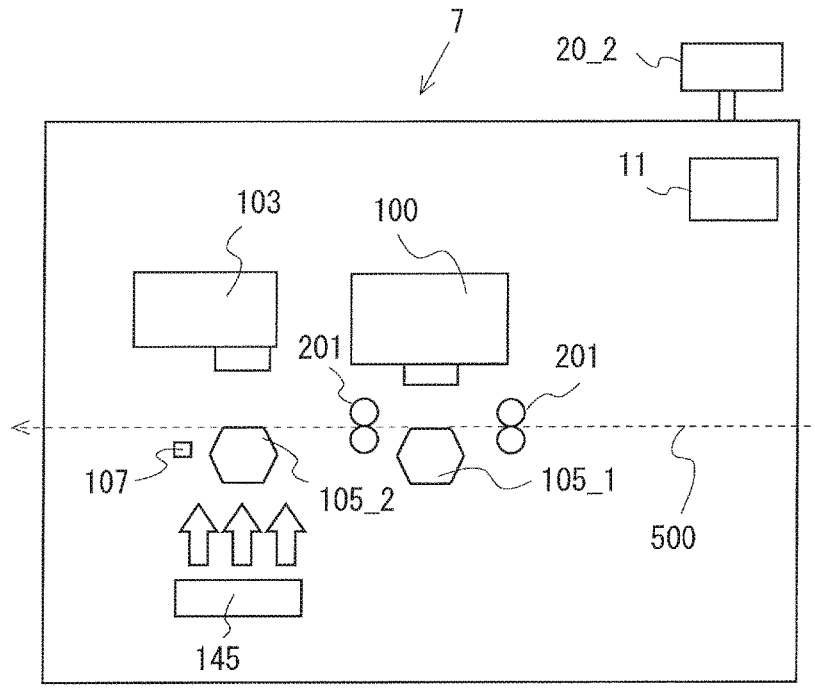
FIG. 3 is a view for showing an example of the configuration of an image reading apparatus 7.

Next, the image reading apparatus 7 will be specifically explained. FIG. 3 is a view for showing an example of the configuration of the image reading apparatus 7. The image reading apparatus 7 is arranged in the downstream side of the image forming apparatus 5 and responsible for reading an image printed on one or both side of a sheet P. The image forming apparatus 5 obtains correction amounts of an image printed on the sheet P based on the reading results such as the color, position and magnification factor of the image, and feeds back the correction amounts of the image to the image forming apparatus 5.

The image reading apparatus 7 is provided with a control unit 11, a scanner 100, a colorimeter 103, reference plates 105_1 and 105_2 and a paper path 500. The paper path 500 is a path through which a sheet P supplied from the image forming apparatus 5 is passed by paper path rollers 201. Meanwhile, while two paper path rollers 201 are illustrated in FIG. 3, the number of the paper path rollers 201 and the locations thereof are not limited thereto.

In addition to this, the image reading apparatus 7 is provided with a cooling device 145 which cools the reference plate 105_2. Specifically, the cooling device 145 is provided with a drive unit and a fan which are not shown in the figure. The drive unit controls the fan to operate and halt by controlling the rotational speed of the fan. The fan controls the blowing amount of air.

The image reading apparatus 7 is provided also with a temperature detection unit 107. The temperature detection unit 107 is located in the vicinity of the reference plate 105_2 and detects the temperature of the reference plate 105_2. The temperature detection unit 107 consists, for example, of an infrared sensor which detects infrared light radiate from a sheet P or the reference plate 105_2.

Also, the image reading apparatus 7 is provided with an operation display 20_2. The operation display 20_2 is implemented with a liquid crystal display (LCD) incorporating a touch panel, and serves as a display unit and an operation unit which are not shown in the figure. The operation display 20_2 has similar constituent elements and functions as the operation display 20_1 so that redundant description is not repeated. Meanwhile, the operation display 20_1 and the operation display 20_2 are referred to simply as the operation display 20 when they need not be distinguished.

For example, receiving a sheet P supplied from the image forming apparatus 5, the image reading apparatus 7 has the scanner 100 and the colorimeter 103 detect the image formed on the sheet P. The result of detecting the image is output to the control unit 11 of the image reading apparatus 7.

The control unit 11 is responsible for controlling the image reading apparatus 7 and can be implemented with a microcomputer consisting mainly of a CPU, a ROM, a RAM, and an I/O interface. As specifically described below, the control unit 11 performs various processes based on the result of detecting the image, and transmits the results of the processes to the control unit 10 of the image forming apparatus 5.

The scanner 100 is arranged to face a sheet P which is passed through the paper path 500 and read an image printed on the sheet P. The scanner 100 is responsible for reading the front side of a sheet P, i.e., performing reading operation of an image printed on the sheet P such as patches which is not shown in the figure.

Meanwhile, in the case where only one scanner is provided as described above, a circulation route may be implemented to read also the back side of a sheet P by reversing and circulating the sheet P.

Incidentally, the image reading apparatus 7 is configured to operate as either an in-line system or an offline system.

The in-line system provides a configuration in which the image reading apparatus 7 is directly fed with a sheet P which is supplied from the image forming apparatus 5 and on which an image is formed. On the other hand, the offline system provides a configuration in which the image reading apparatus 7 is not directly fed with a sheet P which is supplied from the image forming apparatus 5 and on which an image is formed, but the image forming apparatus 5 and the image reading apparatus 7 are designed independently from each other. The following explanation is based on the assumption that an in-line system is used. However, an offline system can be used instead.

The scanner 100 will be specifically explained. The scanner 100 is provided in the upstream side of the colorimeter 103, and consists of a lighting system for irradiating a sheet P which is passed through a reading position, and a line image sensor consisting of a plurality of imaging devices which are linearly arranged in the sheet width direction to photoelectrically convert light reflected from the sheet P in correspondence with picture elements respectively. The reading area of the scanner 100 is determined to cover the maximum width of sheets P which can be transferred from the image forming apparatus 5. The scanner 100 reads the image formed on a sheet as a two-dimensional image P by repeating operation of reading image data from one line along the sheet width direction in synchronization with the operation of conveying the sheet P which is passed through the reading position. The image, which is read, is used as read image data.

The imaging device is implemented as CCDs (Charge Coupled Device). The CCDs serve as an optical sensor which reads an image on a sheet P in a reading position, and arranged in a line to be capable of reading the entire width of the sheet P as a color line sensor.

When performing a reading operation, the scanner 100 has the imaging device, an optical system and the lighting system irradiating the reading position cooperate with each other. The optical system serves to lead an image in a reading position to the CCDs, and is provided with a plurality of mirrors and a plurality of lenses.

Namely, the scanner 100 is provided with the line image sensor for reading a sheet P along the width direction of the sheet P, and capable of acquiring an image of the whole surface of a sheet P by reading each line corresponding to the lateral width of the sheet P in the passing direction of the sheet P.

Incidentally, the reference plate 105_1 is arranged to face the scanner 100, and used when reflecting light which is radiated to a sheet P.

The colorimeter 103 is arranged to face a sheet P passing along the paper path 500 in the downstream side of the scanner 100. For example, the colorimeter 103 guarantees the absolute value of the color of an image formed on a sheet P by colorimetrically measuring patches printed on the sheet P.

Specifically, the colorimeter 103 radiates visible light to the patches from a visible light source which is not shown in the figure. The reference plate 105_2 is arranged in a position opposite the colorimeter 103. The reference plate 105_2 has a chromatic reflecting surface and an achromatic reflecting surface, and either one of the reflecting surfaces faces in accordance with the operation of the colorimeter 103. Accordingly, visible light emitted from the colorimeter 103 is reflected by a sheet P or the reference plate 105_2, and the colorimeter 103 acquires an optical spectrum of the reflected visible light. The optical spectrum acquired by the colorimeter 103 is thereby an optical spectrum in the visible light range.

The color tones of the patches are derived by performing operations in a predetermined color model based on the visible light optical spectrum acquired by the colorimeter 103. The colorimeter 103 colorimetrically measures a sheet P based on an optical spectrum in the visible light range in this manner.

The colorimetric result of the patches is generated as numeric data, i.e., colorimetric values, represented in a predetermined color model such as Lab color space or XYZ color space, and output to the control unit 10 or the control unit 11.

Incidentally, the colorimetric range, i.e., the viewing angle of the colorimeter 103 is narrower than the reading area of the scanner 100, and set to be narrower than the width of the patches in the sheet width direction. Specifically, a lens section which receives the light reflected from the patches has, for example, a diameter of about 4 mm.

Since colorimetric measurement is performed within a limited range of viewing angle in this manner, the colorimeter 103 can generate the color information with higher accuracy than the scanner 100. Because of this, when a sheet P is passed only once through the paper path 500, only one array of patches can be colorimetrically measured.

Meanwhile, the reference plates 105_1 and 105_2 are referred to simply as the reference plate 105 when they need not be distinguished.

Figure 4:
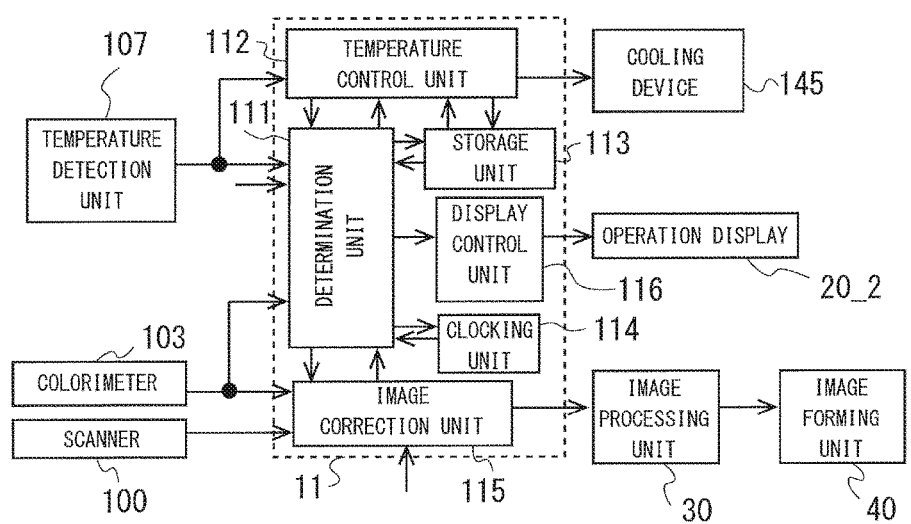
FIG. 4 is a block diagram for showing an example of the functional structure of a control unit 11.
Figures 5, 6:
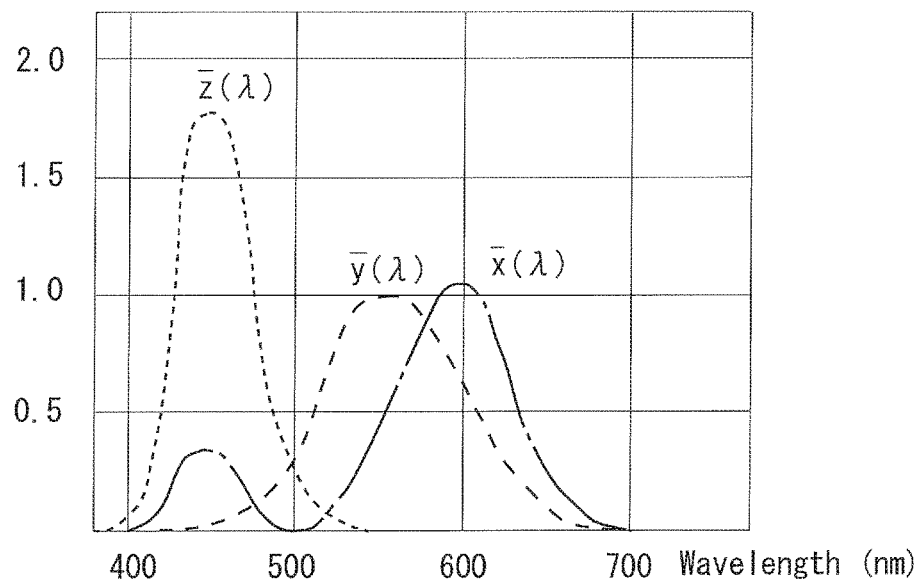
FIG. 5 is a graphic diagram showing examples of optical spectra in a visible light range.
FIG. 6 is a table showing an example of a color difference ΔE*ab for each color.

Next, the control unit 11 will be specifically explained. FIG. 4 is a block diagram for showing an example of the functional structure of the control unit 11. FIG. 5 is a graphic diagram showing examples of optical spectra in the visible light range. FIG. 6 is a table showing an example of a color difference $\Delta E^*ab$ for each color.

The control unit 11 runs a predetermined control program to implement functions including a determination unit 111, a temperature control unit 112, a clocking unit 114, an image correction unit 115 and a display control unit 116 and a data structure in a storage unit 113.

The determination unit 111 operates during performing maintenance of the image reading apparatus 7 to determines whether or not the colorimeter 103 is in a normal condition. Specifically, the determination unit 111 determines whether or not the colorimeter 103 is in a normal condition based on the temperature of the reference plate 105_2 detected by the temperature detection unit 107 and the optical spectrum in the visible light range. The determination unit 111 determines whether or not the colorimetric measurement result of the colorimeter 103 is reliable. When the colorimeter 103 is in an abnormal condition, the peak of the optical spectrum of the colorimeter 103 is shifted. However, the peak of the optical spectrum of the colorimeter 103 can also be shifted depending upon the measurement environment of the colorimeter 103. The reliability of the colorimetric measurement result of the colorimeter 103 is therefore determined by determining whether or not the colorimeter 103 is in a normal condition with the determination unit 111.

For example, when a sheet P discharged from the image forming apparatus 5 is at a high temperature, there occurs deviation in the temperature distribution in the surface of the sheet P as a temperature gradient, and also there occurs deviation in the temperature distribution in the reflecting surface of the reference plate 105_2 as a temperature gradient. If such temperature gradients are formed on the sheet P and the reference plate 105_2, the colorimeter 103 cannot detect correct color tones because of thermochromism which changes a color tone due to a change in temperature.

Specifically, the gradation change rate increases as the temperature rises. Accordingly, there occurs a temperature gradient, correct color tones cannot be detected. For example, when thermochromism occurs to change the reflectance of an object in accordance with a temperature, the peak of the optical spectrum shown in FIG. 5 is shifted. However, if the reflecting surface of the reference plate 105_2 is achromatic, there is no influence of thermochromism so that the reference plate 105_2 is arranged to face the colorimeter 103 with the chromatic reflecting surface when performing maintenance of the image reading apparatus 7.

For example, $\Delta E^*ab$ shown in FIG. 6 are values when the temperature of a BCRA color tile, which is a colorimetric measurement global standard reference tile, was changed by 10° C. from 23° C. to 33° C. Namely, FIG. 6 shows the values when changing the ambient temperature which is an element of the measurement environment by 10° C. from the vicinity of normal temperature. As shown in FIG. 6, while the color difference $\Delta E^*ab$ of white is 0.01, the color difference $\Delta E^*ab$ of green is 0.92.

Specifically, the determination unit 111 determines that the colorimeter 103 is in an abnormal condition if the peak of the optical spectrum as detected by the colorimeter 103 in the visible light range is shifted as compared with an initial optical spectrum in the visible light range even when the temperature of the reference plate 105_2 detected by the temperature detection unit 107 is within a prescribed range around a reference temperature. On the other hand, the determination unit 111 determines that the colorimeter 103 is in a normal condition if the peak of the optical spectrum as detected by the colorimeter 103 in the visible light range is not shifted as compared with the initial optical spectrum in the visible light range when the temperature of the reference plate 105_2 detected by the temperature detection unit 107 is within the prescribed range around a reference temperature. In this case, the reference temperature is a temperature at which the colorimeter 103 can correctly operate. The prescribed range is, for example, within 5° C. from the reference temperature. That is, the prescribed range of the colorimeter 103 is within −5° C. from the reference temperature and within 5° C. from the reference temperature.

Namely, the optical spectrum in the visible light range during performing maintenance is similar to the initial optical spectrum in the visible light range when the temperature of the reference plate 105_2 is within the prescribed range around the reference temperature so that there is no influence of thermochromism as long as the colorimeter 103 is in a normal condition.

The temperature control unit 112 controls the cooling temperature of the cooling device 145 to a target temperature. Specifically, if the temperature of the reference plate 105_2 is changed to the outside of the prescribed range around the reference temperature between a first time and a second time, the temperature control unit 112 cools the reference plate 105_2 within the prescribed range around the reference temperature until the second time.

The determination unit 111 determines that the colorimeter 103 is in an abnormal condition if the optical spectrum as detected at the first time by the colorimeter 103 in the visible light range differs from the optical spectrum as detected at the second time by the colorimeter 103 in the visible light range even when the temperature of the reference plate 105_2 is within the prescribed range around the reference temperature. Conversely, the determination unit 111 determines that the colorimeter 103 is in an normal condition if the optical spectrum as detected at the first time by the colorimeter 103 in the visible light range is similar to the optical spectrum as detected at the second time by the colorimeter 103 in the visible light range when the temperature of the reference plate 105_2 is within the prescribed range around the reference temperature.

In other words, since there is no influence of thermochromism when the temperature of the reference plate 105_2 is within the prescribed range around the reference temperature, the peak of the optical spectrum in the visible light range is not shifted even with the lapse of time as long as the colorimeter 103 is in a normal condition.

If the peak of the optical spectrum as detected by the colorimeter 103 in the visible light range is shifted in proportion to the change in the temperature of the reference plate 105_2 while the temperature of the reference plate 105 is out of the prescribed range around the reference temperature, the determination unit 111 determines that the colorimeter 103 is in a normal condition. Conversely, if the peak of the optical spectrum as detected by the colorimeter 103 in the visible light range is not shifted in proportion to the change in the temperature of the reference plate 105_2 while the temperature of the reference plate 105 is out of the prescribed range around the reference temperature, the determination unit 111 determines that the colorimeter 103 is in an abnormal condition.

In other words, since there is an influence of thermochromism when the temperature of the reference plate 105_2 is out of the prescribed range around the reference temperature, the peak of the optical spectrum in the visible light range is shifted as long as the colorimeter 103 is in a normal condition.

The determination unit 111 thereby determines that thermochromism is a factor of causing a peak shift of the optical spectrum in the visible light range if the peak of the optical spectrum in the visible light range is shifted in proportion to the change in the temperature of the reference plate 105_2 while the temperature of the reference plate 105 is out of the prescribed range around the reference temperature so that it is determined that the colorimeter 103 is in a normal condition.

The operation display 20_2 displays that the colorimeter 103 is in an abnormal condition when the determination unit 111 determines that the colorimeter 103 is in an abnormal condition. Specifically, when the determination unit 111 determines that the colorimeter 103 is in an abnormal condition, the display control unit 116 generates an image display command to indicate the abnormal condition of the colorimeter 103 and has the operation display 20_2 display the indication.

Incidentally, the clocking unit 114 measures time, for example, from the first time to the second time.

The image correction unit 115 obtains the correction amount of an image printed on a sheet P. Specifically, when the determination unit 111 determines that the colorimeter 103 is in a normal condition, the image correction unit 115 obtains the correction amount of an image based on the colorimetric measurement result of the colorimeter 103 and the reading result of the scanner 100.

Specifically, the image correction unit 115 corrects the color information of patches read by the scanner 100 based on the colorimetric values of the patches colorimetrically measured by the colorimeter 103. More specifically, the image correction unit 115 associates the color information of the patches colorimetrically measured by the colorimeter 103 with the color information of the patches read by the scanner 100. Since the color information of the patches colorimetrically measured by the colorimeter 103 and the color information of the patches read by the scanner 100 are associated with each other, the colorimetrically measurement result of the colorimeter 103 can be reflected in the reading result of the scanner 100 to obtain an accurate correction amount.

Incidentally, if the colorimeter 103 correctly operates but is affected by thermochromism, the thermochromism influencing component may be deducted from the color information of the patches colorimetrically measured by the colorimeter 103, or the colorimeter 103 may colorimetrically measure the patches again after the influence of thermochromism disappears so that the measurement result can be used.

The image processing unit 30 optimizes images to be formed by the image forming unit 40 based on the correction amount calculated by the image correction unit 115. The process of optimizing images to be performed by the image processing unit 30 includes positional adjustment of images to be printed on the front and back sides of a sheet P, adjustment of densities, adjustment of color tones and so forth.

Figure 7:
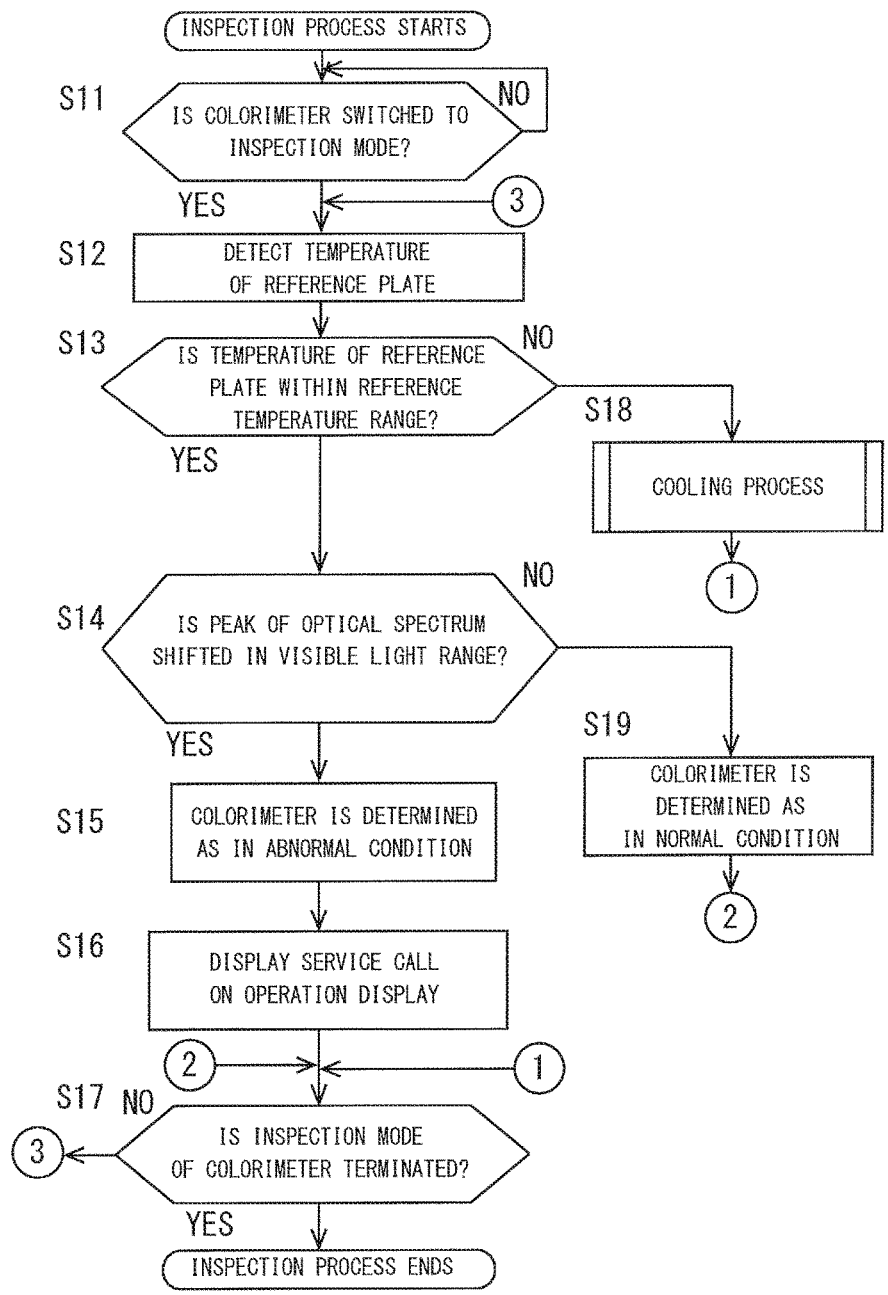
FIG. 7 is a flow chart for showing an inspection process including a cooling process.
Figure 8:
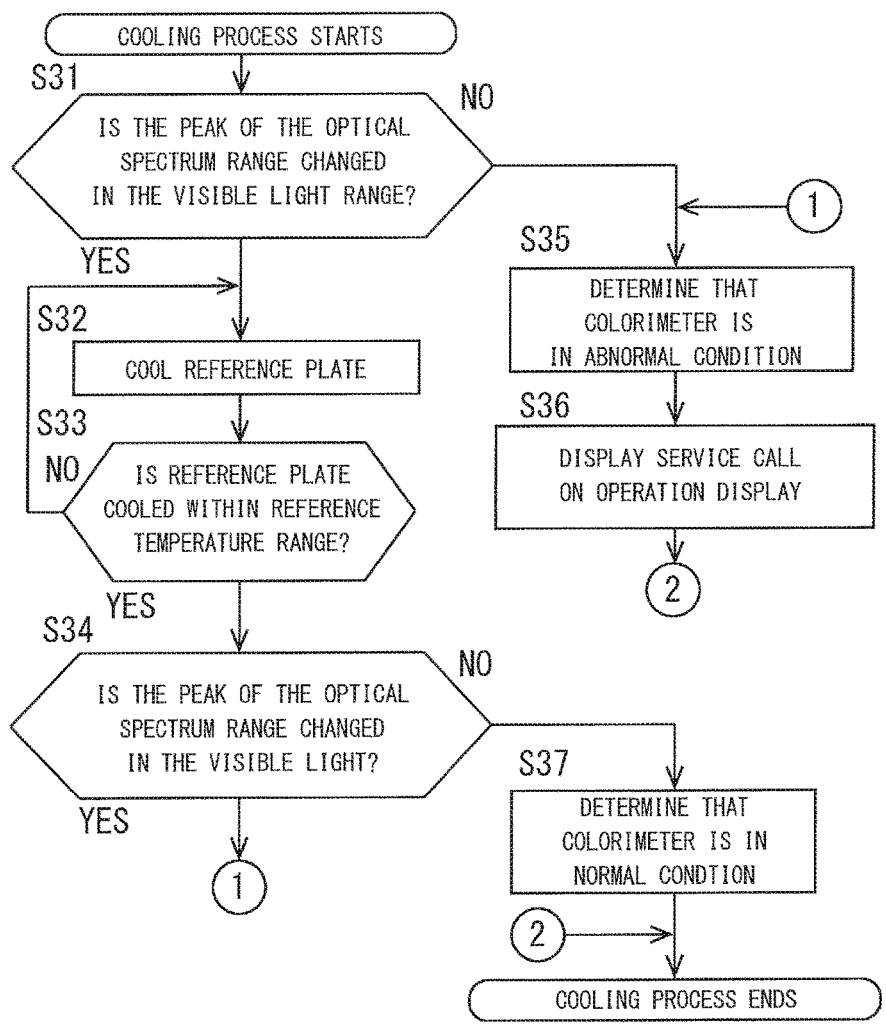
FIG. 8 is a flow chart explaining the cooling process.

Next, an example of controlling the image reading apparatus 7 will be explained. FIG. 7 is a flow chart for showing an inspection process including a cooling process. FIG. 8 is a flow chart explaining the cooling process.

(Inspection Process)

In step S11, the determination unit 111 determines whether or not the colorimeter 103 is switched to an inspection mode. If the colorimeter 103 is in the inspection mode (step S11: YES), the process proceeds to step S12. Conversely, the colorimeter 103 is not switched to the inspection mode yet (step S11: NO), the process is in a standby state.

In step S12, the temperature detection unit 107 detects the temperature of the reference plate 105. The detection result of the temperature detection unit 107 is acquired by the determination unit 111.

In step S13, the determination unit 111 determines whether or not the temperature of the reference plate 105_2 is within the prescribed range around the reference temperature. If the temperature of the reference plate 105_2 is within the prescribed range around the reference temperature (step S13: YES), the process proceeds to step S14. Conversely, if the temperature of the reference plate 105_2 is out of the prescribed range around the reference temperature (step S13: NO), the process proceeds to step S18.

In step S14, the determination unit 111 determines whether or not the peak of the optical spectrum in the visible light range is shifted. If the peak of the optical spectrum in the visible light range is shifted (step S14: YES), the process proceeds to step S15. Conversely, if the peak of the optical spectrum in the visible light range is not shifted (step S14: NO), the process proceeds to step S19.

Specifically, the determination unit 111 determines whether or not the peak of the optical spectrum acquired by the colorimeter 103 in the visible light range is not shifted as compared with the peak of the initial optical spectrum in the visible light range stored in the storage unit 113.

In step S15, the determination unit 111 determines that the colorimeter 103 is in an abnormal condition, and the process proceeds to step S16.

In step S16, the display control unit 116 has the operation display 20_2 output a service call, and the process proceeds to step S17. For example, it is displayed that the colorimeter 103 is in an abnormal condition, together with information about maintenance.

In step S17, the determination unit 111 determines whether or not the inspection mode of the colorimeter 103 is terminated. If the inspection mode of the colorimeter 103 is terminated, the inspection process ends. Conversely, if the inspection mode of the colorimeter 103 is not terminated, the process is returned to step S12.

In step S18, the control unit 11 performs the cooling process, and the process proceeds to step S17. The details of the cooling process will be described later.

In step S19, the determination unit 111 determines that the colorimeter 103 is in a normal condition, and the process proceeds to step S17.

(Cooling Process)

In step S31, the determination unit 111 determines whether or not the peak of the optical spectrum in the visible light range is shifted. If the peak of the optical spectrum in the visible light range is shifted, the process proceeds to step S32. Conversely, if the peak of the optical spectrum in the visible light range is not shifted, the process proceeds to step S35.

Specifically, the determination unit 111 determines whether or not the peak of the optical spectrum acquired by the colorimeter 103 in the visible light range is not shifted as compared with the peak of the initial optical spectrum in the visible light range stored in the storage unit 113.

In step S32, in response to a control command from the temperature control unit 112, the cooling device 145 cools the reference plate 105_2, and the process proceeds to step S33.

In step S33, the temperature control unit 112 determines whether or not the reference plate 105 is cooled within the prescribed range around the reference temperature. If the reference plate 105 is cooled within the prescribed range around the reference temperature, the process proceeds to step S34. Conversely, if the reference plate 105 is not cooled within the prescribed range around the reference temperature, the process is returned to step S32.

In step S34, the determination unit 111 determines whether or not the peak of the optical spectrum in the visible light range is shifted. If the peak of the optical spectrum in the visible light range is shifted, the process proceeds to step S35. Conversely, if the peak of the optical spectrum in the visible light range is not shifted, the process proceeds to step S37.

Specifically, the determination unit 111 determines whether or not the peak of the optical spectrum acquired at the second time after cooling in the visible light range is not shifted as compared with the peak of the optical spectrum acquired at the first time before cooling in the visible light range.

In step S35, the determination unit 111 determines that the colorimeter 103 is in an abnormal condition, and the process proceeds to step S36.

In step S36, the display control unit 116 has the operation display 20_2 output a service call, and the cooling process is terminated. For example, it is displayed that the colorimeter 103 is in an abnormal condition, together with information about maintenance.

In step S37, the determination unit 111 determines that the colorimeter 103 is in a normal condition, and the cooling process is terminated.

Figure 9:
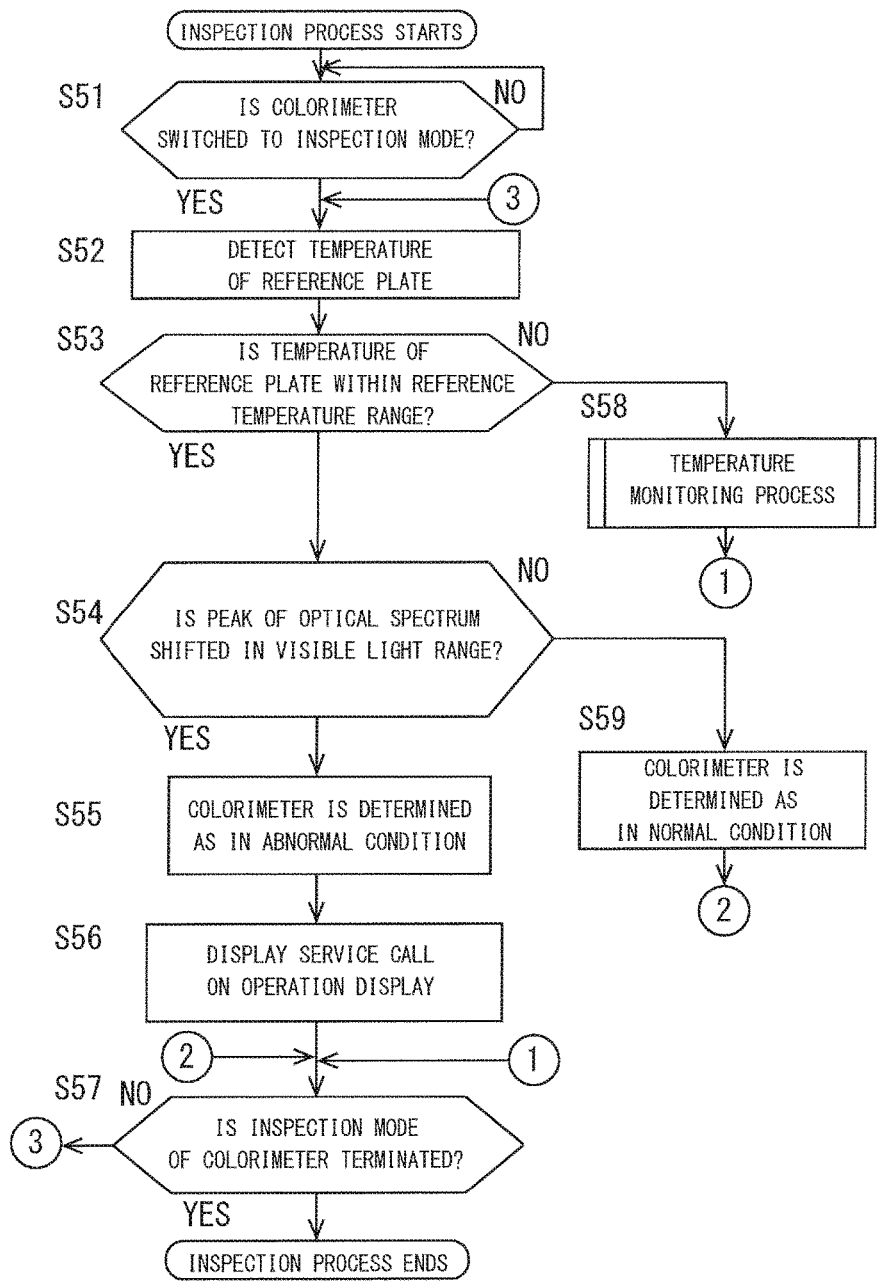
FIG. 9 is a flow chart for showing an inspection process including a temperature monitoring process.
Figure 10:
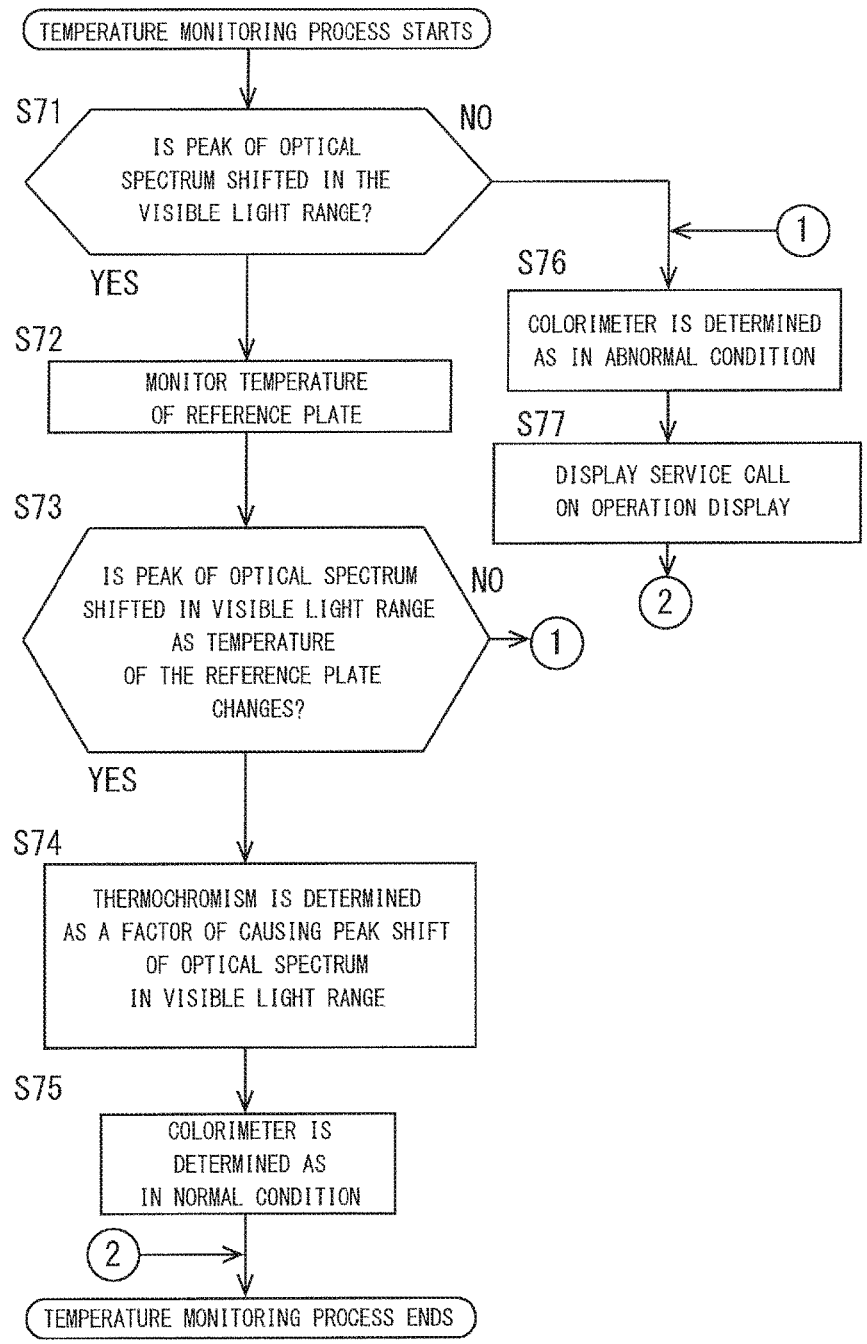
FIG. 10 is a flow chart explaining the temperature monitor process.

Next, another example of controlling the image reading apparatus 7 will be explained. FIG. 9 is a flow chart for showing an inspection process including a temperature monitoring process. FIG. 10 is a flow chart explaining the temperature monitor process.

Of the inspection process, steps S51, S52, S53 (YES), S54, S55, S56, S57 and S59 are performed in the same manner as steps S11, S12, S13 (YES), S14, S15, S16, S17 and S19 of the inspection process as shown in FIG. 7 respectively. Of the inspection process, steps S53 (NO) and S58 are performed differently than steps S13 (NO) and S18 of the inspection process as shown in FIG. 7 respectively. Accordingly, the NO branch of step S53 and step S58 will be explained, but explanation of the other steps is dispensed with.

(Inspection Process)

In step S53, the determination unit 111 determines whether or not the temperature of the reference plate 105_2 is within the prescribed range around the reference temperature. If the temperature of the reference plate 105_2 is out of the prescribed range around the reference temperature (step S53: NO), the process proceeds to step S58.

In step S58, the control unit 11 performs the temperature monitoring process, and the process proceeds to step S57. The details of the temperature monitoring process will be described below.

(Temperature Monitoring Process)

In step S71, the determination unit 111 determines whether or not the peak of the optical spectrum in the visible light range is shifted. If the peak of the optical spectrum in the visible light range is shifted, the process proceeds to step S72. Conversely, if the peak of the optical spectrum in the visible light range is not shifted, the process proceeds to step S76.

Specifically, the determination unit 111 determines whether or not the peak of the optical spectrum acquired by the colorimeter 103 in the visible light range is not shifted as compared with the peak of the initial optical spectrum in the visible light range stored in the storage unit 113.

In step S72, the temperature control unit 112 monitors the temperature of the reference plate 105_2 based on the detection result of the temperature detection unit 107, and the process proceeds to step S73.

In step S73, the determination unit 111 determines whether or not the peak of the optical spectrum in the visible light range is shifted in proportion to the change in the temperature of the reference plate 105_2. If the peak of the optical spectrum in the visible light range is shifted in proportion to the change in the temperature of the reference plate 105_2, the process proceeds to step S74. Conversely, if the peak of the optical spectrum in the visible light range is not shifted in proportion to the change in the temperature of the reference plate 105_2, the process proceeds to step S76.

Specifically, while monitoring the temperature of the reference plate 105_2, the determination unit 111 determines whether or not the shift of the peak of the optical spectrum in the visible light range is synchronized with the change in the temperature of the reference plate 105_2.

In step S74, the determination unit 111 determines that thermochromism is a factor of causing the peak shift of the optical spectrum in the visible light range.

In step S75, the determination unit 111 determines that the colorimeter 103 is in a normal condition, and the temperature monitoring process is terminated.

In step S76, the determination unit 111 determines that the colorimeter 103 is in an abnormal condition, and the process proceeds to step S77.

In step S77, the display control unit 116 has the operation display 20_2 output a service call, and the temperature monitoring process is terminated. For example, it is displayed that the colorimeter 103 is in an abnormal condition, together with information about maintenance.

Incidentally, the cooling process and the temperature monitoring process may be parallelly or successively performed, or only either one process may be performed as shown in FIGS. 7 and 9.

As has been discussed above, the image reading apparatus 7 determines whether or not the colorimeter 103 is in a normal condition based on the temperature of the reference plate 105 and the optical spectrum in the visible light range. This makes use of the fact that the same optical spectrum in the visible light range is colorimetrically measured under the same measurement environment.

Accordingly, if a different optical spectrum in the visible light range is colorimetrically measured under the same measurement environment, it is determined that the colorimeter 103 is in an abnormal condition. Conversely, if there is no change in the optical spectrum in the visible light range even under a different measurement environment, it is determined that the colorimeter 103 is in an abnormal condition.

On the other hand, if the same optical spectrum in the visible light range is colorimetrically measured under the same measurement environment, it is determined that the colorimeter 103 is in a normal condition. Conversely, if there is a change in the optical spectrum in the visible light range even under a different measurement environment, it is determined that the colorimeter 103 is in a normal condition.

Incidentally, as has been discussed above, one of the factors of shifting the optical spectrum in the visible light range even with the colorimeter 103 which is normally operating is thermochromism. The thermochromism is a phenomenon in which the reflectance of an object is changed in accordance with temperature change. For example, a sheet discharged from the image forming apparatus 5 is passed through the fixing unit 60, and therefore heated to a high temperature. Accordingly, since the temperature inside the image reading apparatus 7 is elevated when the sheet discharged from the image forming apparatus 5 is transferred to the image reading apparatus 7, the temperature of the reference plate 105 is also elevated. When the temperature of the reference plate 105 is elevated, the reflectance of the reference plate 105 is changed under the influence of thermochromism. The colorimetric measurement result of the colorimeter 103 is thereby changed in color tones. For example, if the reflectance of the reference plate 105 is changed in order that the peak wavelength of a red component is shifted to the long wavelength side, the color becomes vivid.

Accordingly, when the temperature of the reference plate 105 is elevated, the reflectance is changed depending upon wavelengths in comparison with the case when the temperature of the reference plate 105 is not elevated. Namely, the optical spectrum in the visible light range, particularly, the peak of the optical spectrum in the visible light range is changed.

Specifically, since heat is a factor of causing thermochromism, the temperature of the reference plate 105_2 is used as a reference for determining whether or not the environment is the same. The reference plate 105_2 is arranged to face the colorimeter 103, and affects the colorimetric measurement result of the colorimeter 103. If the color of the reference plate 105_2 is achromatic, there is no influence of thermochromism, but the wavelength shift amounts over the entirety of the visible light range cannot be confirmed.

Accordingly, the color of the reference plate 105_2 is preferably chromatic, particularly a green tile is preferred in order to determine to which of the long wavelength side and the short wavelength side the peak wavelength of the same color component is shifted. Green corresponds to an intermediate wavelength of the visible light range. Accordingly, while there is influence of thermochromism on such a green tile, wavelength shift amounts can be confirmed over the entirety of the visible light range.

As has been discussed above, the image reading apparatus 7 can determine the reliability of the colorimetric measurement result of the colorimeter 103 by determining whether or not the colorimeter 103 is in a normal condition based on the temperature of the reference plate 105 having a chromatic reflecting surface and the optical spectrum in the visible light range, and therefore accurate image correction can be performed.

Also, when the temperature of the reference plate 105 is within the prescribed range around the reference temperature, it can be determined whether or not the colorimeter 103 is in an abnormal condition by confirming the change in the peak of the optical spectrum in the visible light range. Specifically, if the colorimeter 103 is in a normal condition and the temperature of the reference plate 105 is within the prescribed range around the reference temperature, the peak wavelength of each color component is not shifted to neither the long wavelength side nor the short wavelength side. On the other hand, if the colorimeter 103 is in an abnormal condition, the peak wavelength of a color component is shifted to either the long wavelength side or the short wavelength side even when the temperature of the reference plate 105 is within the prescribed range around the reference temperature.

Accordingly, if the temperature of the reference plate 105 is within the prescribed range around the reference temperature, the reliability of the colorimetric measurement result of the colorimeter 103 can be evaluated by determining whether or not the colorimeter 103 is in an abnormal condition based on whether or not the peak of the optical spectrum in the visible light range is shifted. Accurate image correction is possible based on the shift amount of the peak of the optical spectrum in the visible light range as long as the temperature of the reference plate 105 is within the prescribed range around the reference temperature.

Also, when the temperature of the reference plate 105 is out of the prescribed range around the reference temperature, it can be determined whether or not the colorimeter 103 is in an abnormal condition by cooling the reference plate 105 within the prescribed range around the reference temperature and determining the shift of the peak of the optical spectrum in the visible light range. Specifically, if the temperature of the reference plate 105 is changed to the outside of the prescribed range around the reference temperature between a first time and a second time, the reference plate 105 is cooled within the prescribed range around the reference temperature until the second time. In this case, the temperature of the reference plate 105 is controlled within the prescribed range around the reference temperature when the optical spectrum is acquired at the second time in the visible light range and also when the optical spectrum is acquired at the first time in the visible light range. The measurement environment at the second time is thereby controlled to be equivalent to that at the first time.

Accordingly, it is determined whether or not the colorimeter 103 is in a normal condition by comparing the optical spectrum acquired at the second time in the visible light range with the optical spectrum acquired at the first time in the visible light range. By this configuration, even with the colorimetric measurement results at different times, the reliability of the colorimetric measurement of the colorimeter 103 can be determined to make it possible to perform accurate image correction.

Also, even when the temperature of the reference plate 105 is out of the prescribed range around the reference temperature, it is determined whether or not the colorimetric measurement result is influenced by thermochromism as long as the temperature of the reference plate 105 is changed.

Specifically, it is determined whether or not the peak of the optical spectrum in the visible light range is shifted in proportion to the change in the temperature of the reference plate 105 by monitoring the temperature of the reference plate 105. If the peak of the optical spectrum in the visible light range is shifted in proportion to the change in the temperature of the reference plate 105, it is determined that the colorimeter 103 is in a normal condition. Thus, as long as the peak of the optical spectrum in the visible light range is shifted to follow the temperature change of the reference plate 105 even if the temperature of the reference plate 105 is out of the prescribed range around the reference temperature, the reliability of the colorimetric measurement result of the colorimeter 103 can be determined so that accurate image correction can be performed.

Also, when the colorimeter 103 is in a normal condition and the peak of the optical spectrum in the visible light range is shifted while monitoring the temperature of the reference plate 105 which is changing, it is determined that thermochromism is a factor of causing the peak shift of the optical spectrum in the visible light range.

Specifically, as described above, the thermochromism is a phenomenon in which the reflectance of an object is changed in accordance with temperature change. Color tones of the colorimetric measurement result of the reference plate 105 obtained by the colorimeter 103 are thereby changed by the influence of thermochromism. Accordingly, if the colorimeter 103 is in a normal condition, the peak of the optical spectrum in the visible light range is shifted in proportion to the change in the temperature of the reference plate 105. It is thereby determined that thermochromism is a factor of causing a peak shift of the optical spectrum in the visible light range if the peak shift of the optical spectrum in the visible light range is synchronized with the change in the temperature of the reference plate 105. Thus, when it is determined that the colorimeter 103 is in a normal condition, thermochromism is determined as a factor of causing a peak shift of the optical spectrum in the visible light range even if the temperature of the reference plate 105 is out of the prescribed range around the reference temperature, and therefore it is determined that the colorimetric measurement result of the colorimeter 103 is affected by the temperature inside the image reading apparatus 7.

Furthermore, in the case where the colorimeter 103 is determined as in an abnormal condition, this fact is displayed to the outside of the system. It is therefore possible to prompt an operator operating the image forming system 1 to perform maintenance of the colorimeter 103.

As has been discussed above, the image reading apparatus 7 of the present embodiment is provided with the colorimeter 103 which colorimetrically measures an image formed on a sheet P based on the optical spectrum in the visible light range, the reference plate 105_2 located in the position facing the colorimeter 103 with a chromatic reflecting surface, the temperature detection unit 107 configured to detect the temperature of the reference plate 105_2, the determination unit 111 configured to determine whether or not the colorimeter 103 is in a normal condition based on the temperature of the reference plate 105_2 detected by the temperature detection unit 107 and the optical spectrum in the visible light range.

By this configuration, accurate image correction can be performed.

Also, when the temperature of the reference plate 105_2 detected by the temperature detection unit 107 is within the prescribed range around the reference temperature, the determination unit 111 of the image reading apparatus 7 of the present embodiment determines that the colorimeter 103 is in an abnormal condition if the peak of the optical spectrum as detected by the colorimeter 103 in the visible light range is shifted as compared with an initial optical spectrum in the visible light range, and that the colorimeter 103 is in a normal condition if the peak of the optical spectrum as detected by the colorimeter 103 in the visible light range is not shifted as compared with an initial optical spectrum in the visible light range.

By this configuration, if the temperature of the reference plate 105_2 is within the prescribed range around the reference temperature, it is possible to performs accurate image correction based on the shift amount of the peak of the optical spectrum in the visible light range.

Furthermore, in accordance with the image reading apparatus 7 of the present embodiment, the cooling device 145 is further provided to cool the reference plate 105_2 within the prescribed range around the reference temperature until the second time when the temperature of the reference plate 105_2 is changed to the outside of the prescribed range around the reference temperature between a first time and a second time, and the determination unit 111 determines, when the temperature of the reference plate 105_2 is within the prescribed range around the reference temperature, that the colorimeter 103 is in an abnormal condition if the peak of the optical spectrum as detected at the first time by the colorimeter 103 in the visible light range differs from the peak of the optical spectrum as detected at the second time by the colorimeter 103 in the visible light range, and that the colorimeter 103 is in a normal condition if the peak of the optical spectrum as detected at the first time by the colorimeter 103 in the visible light range is equal to the peak of the optical spectrum as detected at the second time by the colorimeter 103 in the visible light range.

By this configuration, even with the colorimetric measurement results at different times, the reliability of the colorimetric measurement of the colorimeter 103 can be determined to make it possible to perform accurate image correction.

Still further, in accordance with the image reading apparatus 7 of the present embodiment, when the temperature of the reference plate 105 is out of the prescribed range around the reference temperature, the determination unit 111 determines that the colorimeter 103 is in a normal condition if the peak of the optical spectrum as detected by the colorimeter 103 in the visible light range is shifted in proportion to the change in the temperature of the reference plate 105_2, and that the colorimeter 103 is in an abnormal condition if the peak of the optical spectrum as detected by the colorimeter 103 in the visible light range is not shifted in proportion to the change in the temperature of the reference plate 105_2.

Thus, as long as the peak of the optical spectrum in the visible light range is shifted to follow the temperature change of the reference plate 105_2 even if the temperature of the reference plate 105_2 is out of the prescribed range around the reference temperature, the colorimetric measurement result of the colorimeter 103 can be determined as reliable so that accurate image correction can be performed.

Still further, in accordance with the image reading apparatus 7 of the present embodiment, the determination unit 111 determines that thermochromism is a factor of causing a peak shift of the optical spectrum as detected by the colorimeter 103 in the visible light range if it is determined that the colorimeter 103 is in a normal condition.

Thus, when it is determined that the colorimeter 103 is in a normal condition, thermochromism is determined as a factor of causing a peak shift of the optical spectrum in the visible light range even if the temperature of the reference plate 105_2 is out of the prescribed range around the reference temperature, and therefore it is determined that the colorimetric measurement result of the colorimeter 103 is affected by the temperature inside the system.

Also, the image reading apparatus 7 of the present embodiment is provided further with the operation display 20_2 which displays that the colorimeter 103 is in an abnormal condition when the determination unit 111 determines that the colorimeter 103 is in an abnormal condition. The operation display 20_1 is implemented with a liquid crystal display (LCD) incorporating a touch panel.

It is therefore possible to prompt an operator to perform maintenance of the colorimeter 103.

Incidentally, the image forming system 1 of the present embodiment includes the image reading apparatus 7.

The image forming system 1 can thereby improve the reliability of the correction amount which is fed back.

The image reading apparatus 7 have been explained based on the embodiments in accordance with the present invention. However, it is not intended to limit the present invention to the precise form described, and obviously many modifications and variations are possible without departing from the scope of the invention.

For example, while an in-line system is used in the image reading apparatus 7 of the present embodiment, the present invention is not limited thereto but can be applied to an off-line system.

Also, while the scanner 100 for reading the front side of a sheet P is provided in the above example, the present invention is not limited to this but another scanner may be provided for reading the back side of the sheet P in order that the reading result is used, for example, to check misalignment between images printed on the front and back sides of the sheet P, and the existence of an unexpected image or the like.

Also, while the imaging device consists of CCDs in the above example, the present invention is not limited to this structure but the imaging device may consist of CMOSs.

Furthermore, while the prescribed range is within 5° C. from the reference temperature in the above example, it is not limited thereto but can be another range. That is, any range may be employed as long as the colorimeter 103 can normally operates.

What is claimed is:

1. An image reading apparatus comprising:
   a colorimeter structured to colorimetrically measures an image formed on a sheet based on an optical spectrum in a visible light range;
   a reference plate located in a position facing the colorimeter with a chromatic reflecting surface;
   a temperature detection unit structured to detect a temperature of the reference plate;
   a determination unit structured to determine whether or not functioning of the colorimeter itself is in a normal condition based on the temperature of the reference plate detected by the temperature detection unit and the optical spectrum in the visible light range.

2. The image reading apparatus of claim 1 wherein the determination unit determines, when the temperature of the reference plate detected by the temperature detection unit is within a prescribed range around a reference temperature,
   that the colorimeter is in an abnormal condition if a peak of the optical spectrum as detected by the colorimeter in the visible light range is shifted as compared with an initial optical spectrum in the visible light range, and
   that the colorimeter is in a normal condition if a peak of the optical spectrum as detected by the colorimeter in the visible light range is not shifted as compared with the initial optical spectrum in the visible light range.

3. The image reading apparatus of claim 2 further comprising:
   a cooling device structured to cool the reference plate within the prescribed range around the reference temperature until a second time when the temperature of the reference plate is changed to the outside of the prescribed range around the reference temperature between a first time and a second time, and wherein
   the determination unit determines, when the temperature of the reference plate is within the prescribed range around the reference temperature,
   that the colorimeter is in an abnormal condition if a peak of the optical spectrum as detected at the first time by the colorimeter in the visible light range differs from a peak of the optical spectrum as detected at the second time by the colorimeter in the visible light range, and
   that the colorimeter is in a normal condition if a peak of the optical spectrum as detected by the colorimeter at the first time in the visible light range is equal to a peak of the optical spectrum as detected at the second time by the colorimeter in the visible light range.

4. The image reading apparatus of claim 2 wherein the determination unit determines, when the temperature of the reference plate is out of the prescribed range around the reference temperature,
   that the colorimeter is in a normal condition if a peak of the optical spectrum as detected by the colorimeter in the visible light range is shifted in proportion to the change in the temperature of the reference plate, and
   that the colorimeter is in an abnormal condition if a peak of the optical spectrum as detected by the colorimeter in the visible light range is not shifted in proportion to the change in the temperature of the reference plate.

5. The image reading apparatus of claim 4 wherein the determination unit determines that thermochromism is a factor of causing the peak shift of the optical spectrum as detected by the colorimeter in the visible light range if it is determined that the colorimeter is in a normal condition.

6. The image reading apparatus of claim 2 further comprising:
   an operation display structured to display that the colorimeter is in an abnormal condition when the determination unit determines that the colorimeter is in an abnormal condition, wherein
   the operation display is implemented with a liquid crystal display incorporating a touch panel.

7. The image reading apparatus of claim 1, further comprising a cooling device structured to cool the reference plate within a prescribed range around a reference temperature.

8. An image forming system comprising:
   an image reading apparatus as recited in claim 1; and
   an image forming apparatus structured to form an image on the sheet.

* * * * *